United States Patent [19]

Meschenmoser

[11] Patent Number: 5,664,903
[45] Date of Patent: Sep. 9, 1997

[54] SUPPORT CONNECTIONS

[75] Inventor: Andreas Meschenmoser, Horgenzell, Germany

[73] Assignee: Voith Sulzer Papiermaschinen GmbH, Heidenheim, Germany

[21] Appl. No.: 540,066

[22] Filed: Oct. 6, 1995

[30] Foreign Application Priority Data

Oct. 7, 1994 [DE] Germany ............ 44 35 897.0

[51] Int. Cl.$^6$ .................................................. F16B 7/04
[52] U.S. Cl. ................. 403/387; 403/28; 403/41; 100/168; 162/358.3
[58] Field of Search ..................... 403/381, 384, 403/389, 28–30, 24, 41, 387, 388; 100/168, 169, 171, 176, 155 R; 162/358.1, 358.3, 272

[56] References Cited

U.S. PATENT DOCUMENTS

| | | | |
|---|---|---|---|
| 4,302,149 | 11/1981 | Smale | 403/30 X |
| 4,764,340 | 8/1988 | Lui et al. | 403/30 X |
| 4,772,139 | 9/1988 | Bretton | 403/29 X |
| 5,074,697 | 12/1991 | Blanpain et al. | 403/28 |
| 5,291,826 | 3/1994 | Schiel | 162/358.3 X |
| 5,305,689 | 4/1994 | Schiel | 162/358.2 X |
| 5,400,708 | 3/1995 | Meschenmoser | 102/358.3 X |
| 5,496,442 | 3/1996 | Laapotti | 162/358.3 X |
| 5,535,670 | 7/1996 | Schiel et al. | 162/358.3 X |

FOREIGN PATENT DOCUMENTS

| | | |
|---|---|---|
| 4110205 | 10/1992 | Germany . |
| 4202221 | 12/1992 | Germany . |
| 4217560 | 12/1993 | Germany . |
| 0541088 | 10/1973 | Switzerland . |

*Primary Examiner*—Harry C. Kim
*Attorney, Agent, or Firm*—Greenblum & Bernstein P.L.C.

[57] ABSTRACT

Support connections. Support connection are provided between two rolls, with the roll covering of at least one roll being journalled on a carrier via a plurality of support elements as well as being displaceable relative to the carrier along the pressure plane, with support portions that receive the carrier being connected via elongated connection parts, having thickened portions on both ends thereof, with the thickened portions being connected in a form-locking manner with respective recesses of the support parts in a removable manner, with the connection parts, between the thickened portions, in a direction parallel with the pressure plane, being substantially longer than laterally extending with respect thereto and, between the thickened portions, at least one elongated opening being provided therein, with the opening dividing the connection parts in the direction of the roll axis.

10 Claims, 1 Drawing Sheet

SUPPORT CONNECTIONS

CROSS REFERENCE TO RELATED APPLICATIONS

This application claims the priority of German Application No. DE P 44 35 897.0, filed Oct. 7, 1994, the disclosure of which is incorporated herein by reference in its entirety.

BACKGROUND OF THE INVENTION

1. Field of the Invention

This invention pertains to support connections between two rolls wherein the roll covering of at least one roll is rotatably arranged about a fixed carrier, is journalled on the carrier via at least one support element as well as being displaceable relative to the carrier along a pressure plane of one of the rolls, and wherein each end of the carrier is received in respective support parts thereof, via at least one elongated connection part extending parallel to the pressure plane, with the connection part having portions of increased size on both ends thereof, with the portions of increased size being connected in a form-locking manner with respective recesses in the support parts in a removable manner and parallel with the roll axis.

2. Discussion of the Background of the Invention and Material Information

Connections of this type are set forth in German Patent Publication DE-PS 42 02 221 and are utilized in roll arrangements for the production and treatment of material webs, particularly fiber webs or bands.

In the unloaded state or condition these connection parts are at low tension and are readily removable, for example when a roll covering or a felt band must be changed. During the loaded state of the roll arrangement however, problems can occur when the support parts move relative to each other in the axial direction, which can occur as a result of differing thermal expansions of the rolls.

In order to form the connection parts so as to permit axial movement, German Patent Publication DE-OS 42 17 560 suggests, instead of a connection part, the utilization of at least two tie rods. The splitting of the connection part into several single elements, while improving the mobility in the desired manner also produces disadvantages which entail, on one hand, a decreased manageability of the plurality of pull rods as opposed to but one connection part and, on the other hand, to localized excessive loadings of the pull rods. These disadvantages occur particularly in that the pull rods and their thickened or enlarged areas, within the recesses, at a relative displacement of the support parts become slanted which, in the thickened areas, results in edge loading as well as increased notch loading at the transition to the thickened portions.

It is thus the task or object of this invention, to further develop the support connections between two rolls wherein the roll covering of at least one roll is rotatably arranged about a fixed carrier, is journalled on the carrier via at least one support element as well as being displaceable relative to the carrier along a pressure plane of one of the rolls, and wherein each end of the carrier is received in respective support parts thereof, via at least one elongated connection part extending parallel to the pressure plane, with the connection part having portions of increased size on both ends thereof, with the portions of increased size being connected in a form-locking manner with respective recesses in the support parts in a removable manner and parallel with the roll axis, so that the support connections are movable and readily manageable in the axial direction while yet-providing, during the displacement of the support parts, relative to each other, an improved stress distribution relative to the state of the art.

SUMMARY OF THE INVENTION

The task or object of this invention is achieved via a first embodiment of the support connections between two rolls wherein the roll covering of at least one roll is rotatably arranged about a fixed carrier, is journalled on the carrier via at least one support element as well as being displaceable relative to the carrier along a pressure plane of one of the rolls, and wherein each end of the carrier is received in respective support parts thereof, via at least one elongated connection part extending parallel to the pressure plane, with the connection part having portions of increased size on both ends thereof, with the portions of increased size being connected in a form-locking manner with respective recesses in the support parts in a removable manner and parallel with the roll axis, wherein the connection part between the portions of increased size, in a direction parallel with the pressure plane, is substantially longer than laterally extending, with respect thereto, and wherein, between the portions of increased size, at least one elongated opening is provided therein, with the opening dividing the connection part in the direction of the roll axis.

In another embodiment of the support connections of this invention, the opening is in the form of a slit.

In a further embodiment of the support connections of this invention, the opening extends all the way into the portions of increased size.

In a differing embodiment of the support connections of this invention, about 30–80% of the cross sectional area of the portions of increased size is apertured.

In that, the connection part, between the thickened portions, in a direction parallel with the pressure plane, is substantially longer than laterally extending, with respect thereto, and that, between the thickened portions at least one elongated opening is provided therein, with the opening dividing the connection part in the direction of the roll axis, substantially increases the mobility in the axial direction. In addition thereto, the connection part remains unitary which has a positive effect in the manageability during the sliding in and the removal of the connection part.

Since the enlarged or thickened portions remain at least partially connected, a slanting or canting of the connection part, during the displacement of the support parts, can be effectively countered. The connection part substantially counters the positional change via a bending between the thickened areas, so that the thickened portions have a better fit within the recesses and touch not only with their edge, which leads to the noted edge loading and the increased notch loading.

In order to limit the size of the connection piece and in order to achieve a very stable connection across the apertures, the apertures should take the form of slits which additionally also simplifies the production thereof.

The apertures should extend clear into the thickened portions which increases the mobility or movement of the connection part. However, in order to achieve a compromise between the axial mobility while yet retaining a highest rigidity between the apertures, the cross sectioned area of the thickened portions should be apertured in the range of 30 to 80%.

For directional recitations it should be noted that the pressure plane extends through the carriers of both of the rolls that form a press gap and that the axial direction pertains to the carriers of the rolls.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS AND BEST MODE

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
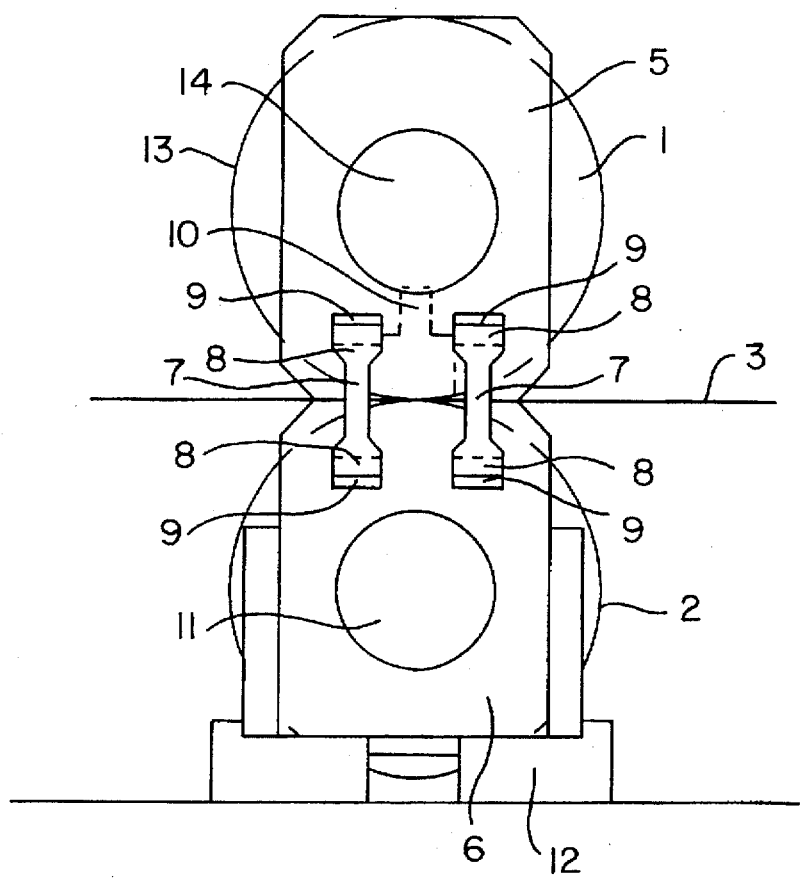
FIG. 1 is a cross section through a schematic roll arrangement.

In the embodiment of FIG. 1, two rolls 1 and 2 form a roll gap for the treatment of a material web or band 3, wherein the roll covering or jacket 13 of the upper roll 1 is rotatably arranged about a fixed carrier 14, with roll covering 13 being journalled thereon via a plurality of support elements 10 and being movable along the pressure plane of roll 1. Support elements of this type are, for example, set forth in Swiss Patent CH-PS 541 088. Quite frequently such roll arrangements are utilized for the dehydration/dewatering or the smoothing of paper webs or bands.

Support parts 5 and 6, which respectively receive one end of carriers 14 and 11, are each connected in a form-locking manner via two elongated connection parts 7 that extend along the pressure plane over the entire support part width or thickness. Connection parts 7 have thickened portions or portions of increased size 8 on both ends thereof that are connected in a removable manner with corresponding recesses or openings 9 in support parts 5 and 6. Recesses 9, symmetrically arranged relative to the pressure plane, are of elongated form with an adjacent bore for the reception of thickened portions or portions of increased size 8. Support portions 6 of lower rolls 2 each are supported on fixed side-guided frame 12.

During the assembly, after connection parts 7 have been slid into recesses 9, there occurs the fixation of the connection via the displacement of roll covering 13 along the pressure plane to roll 2 with the aid of support elements 10. The connection is loosened in the reversed order.

In order to secure connection parts 5 and 6 against displacement, any desired known type of safety elements can be utilized. In addition, it is possible to utilize the support connections with more than two superposed rolls 1 and 2, wherein however at least one roll covering 13 of each respective roll gap, formed by rolls 1 and 2, must be displaceable along the pressure plane in the manner previously described.

While the described roll arrangement is primarily useful for the smoothing of fiber webs or bands, this invention is also useable, without modification, with so-called elongated gap presses, particularly for the dehydration/dewatering or smoothing of fiber webs.

In order to permit length changes of rolls 1 and 2 due to thermal requirements, support parts 5 and 6, which receive carriers 11 and 14, must be movable relative to each other on at least one end of rolls 1 and 2. This also requires a corresponding axial movement or mobility of connection parts 7, in the stretched condition, which-is substantially achieved in that connection part 7, between thickened portions 8 and parallel with the pressure plane, is substantially longer than wide or lateral and that between thickened areas or portions 8 at least one elongated opening 4 is provided, with opening 4 subdividing connection part.7 when viewed in the direction of the roll axis.

Figure 2:
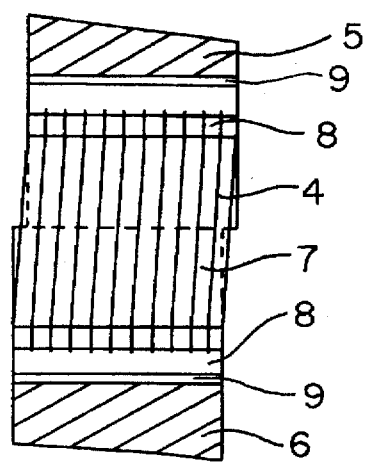
FIG. 2 is an enlarged partial section, in the axial direction through the support parts that are connected via the connection parts of this invention.

As illustrated in FIG. 2, apertures 4 have, in this instance, the form of vertically extending slits that extend between thickened portions 8 and which extend into thickened portions 8 wherein respectively 30–80% of the cross sectional areas of thickened portions 8 are apertured. These slits can readily deviate from the noted vertical arrangements.

This type of construction also ensures, in addition to the simple manufacture of connection parts 7, good manageability. Furthermore, a slanted arrangement or location of connection parts 7, together with the undesired loadings associated therewith, is counteracted.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. Support connections for supporting at least two rolls in which at least one of the at least two rolls is mounted for rotation about a fixed carrier, the fixed carrier including an axis of rotation, and the at least two rolls are mounted to form a pressure plane comprising the axis of rotation, the at least one roll further including at least one support element displaceable relative to the fixed carrier, and the at least one roll being displaceable relative to the fixed carrier along the pressure plane, said support connections comprising:

a first support part receiving a first end of the fixed carrier;

a second support part receiving a first end of a carrier of an other of the at least two rolls;

each of the first and second support parts comprising recesses formed parallel to the axis of rotation, an elongated connection part, with a pair of ends, extending parallel to the pressure plane and comprising a portion of increased size at each end, the portions of increased size being slidably received in the recesses;

the elongated connection part further comprising a middle portion being positioned between each portion of increased size, the middle portion comprising a plurality of parallel longitudinal sections arranged parallel to the pressure plane, and at least one elongated opening formed between the plurality of longitudinal sections, each of the at least one elongated openings being perpendicular to the pressure plane.

2. The support connections of claim 1, wherein the at least one elongated opening is in the form of a slit.

3. The support connections of claim 2, wherein the at least one elongated opening extends all the way into the portions of increased size.

4. The support connections of claim 3, wherein about 30–80% of the cross sectional area of the portions of increased size is apertured.

5. The support connections of claim 1, wherein the at least one elongated opening extends all the way into the portions of increased size.

6. The support connections of claim 5, wherein about 30–80% of the cross sectional area of the portions of increased size is apertured.

7. The support connections of claim 1, each of the ends comprising a single piece formed parallel to the pressure plane and at least one slit formed within the portion of increased size coupled to the at least one elongated opening to extend the at least one elongated opening into the portion of increased size.

8. The support connections of claim 1, each end comprising at least one slit coupled to the at least one elongated opening.

9. The support connections of claim 1, each end is mounted for movement relative to each other end.

10. The support connections of claim 1, a length of each parallel longitudinal section in a direction parallel to the pressure plane being greater than a length of the parallel arrangement in a direction of the rotational axis.

* * * * *